United States Patent
Choi et al.

(10) Patent No.: US 12,400,577 B2
(45) Date of Patent: Aug. 26, 2025

(54) DISPLAY DRIVING CIRCUIT

(71) Applicant: SAMSUNG ELECTRONICS CO., LTD., Suwon-si (KR)

(72) Inventors: Youngseob Choi, Suwon-si (KR); Kunhyung Kwon, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 18/404,244

(22) Filed: Jan. 4, 2024

(65) Prior Publication Data
US 2024/0233608 A1  Jul. 11, 2024

(30) Foreign Application Priority Data
Jan. 5, 2023 (KR) .................. 10-2023-0001913

(51) Int. Cl.
G06F 3/01 (2006.01)
G09G 3/20 (2006.01)
G06F 3/041 (2006.01)

(52) U.S. Cl.
CPC ........... G09G 3/2096 (2013.01); G06F 3/011 (2013.01); *G06F 3/0416* (2013.01); *G09G 2330/022* (2013.01); *G09G 2354/00* (2013.01); *G09G 2360/14* (2013.01); *G09G 2370/00* (2013.01)

(58) Field of Classification Search
CPC .................................. G06F 3/048; G06F 3/04
See application file for complete search history.

(56) References Cited

U.S. PATENT DOCUMENTS

| | | | |
|---|---|---|---|
| 5,734,373 A * | 3/1998 | Rosenberg | A63F 13/285 345/161 |
| 9,973,618 B2 | 5/2018 | Kang et al. | |
| 10,127,849 B2 | 11/2018 | Connell et al. | |
| 10,503,280 B2 | 12/2019 | Yoo et al. | |
| 10,672,097 B2 | 6/2020 | Bae et al. | |
| 10,672,317 B2 | 6/2020 | Lee et al. | |
| 11,307,733 B2 | 4/2022 | Luo et al. | |
| 11,450,263 B2 | 9/2022 | Lim et al. | |
| 11,460,901 B2 | 10/2022 | Kim et al. | |
| 2017/0249028 A1* | 8/2017 | Marshall | G06F 3/0418 |
| 2020/0167016 A1* | 5/2020 | Lee | G06F 3/04883 |
| 2022/0319372 A1 | 10/2022 | Lee et al. | |
| 2023/0118391 A1 | 4/2023 | Choi et al. | |
| 2024/0319678 A1* | 9/2024 | Fukasawa | G06F 3/0488 |

FOREIGN PATENT DOCUMENTS

| | | |
|---|---|---|
| KR | 10-2017-0098111 A | 8/2017 |
| KR | 10-2021-0158482 A | 12/2021 |
| KR | 10-2401858 B1 | 5/2022 |
| KR | 10-2022-0135785 A | 10/2022 |

* cited by examiner

*Primary Examiner* — Joseph R Haley
(74) *Attorney, Agent, or Firm* — Sughrue Mion, PLLC

(57) ABSTRACT

Provided is a display driving circuit for driving a display panel. The display driving circuit includes: an interface configured to receive, from a sensor hub including an acceleration sensor, an acceleration sensing signal of the acceleration sensor, and a processor configured to: calculate a number of steps based on the acceleration sensing signal; generate sensing image data based on the number of steps; and control a display panel to display an image indicating the number of steps.

18 Claims, 13 Drawing Sheets

DISPLAY DRIVING CIRCUIT

CROSS-REFERENCE TO RELATED APPLICATION

This application is based on and claims priority to Korean Patent Application No. 10-2023-0001913, filed on Jan. 5, 2023, in the Korean Intellectual Property Office, the disclosure of which is incorporated by reference herein in its entirety.

BACKGROUND

The present disclosure relates to a semiconductor device, and more particularly, to a display driving circuit for driving a display panel to display images on the display panel.

A display device includes a display panel for displaying images and a display driving circuit for driving the display panel. The display driving circuit may receive image data from a host and apply an image signal corresponding to the received image data to a data line of the display panel, thus driving the display panel. The display device may be realized in different forms, such as a liquid-crystal display (LCD), a light-emitting diode (LED) display, an organic LED (OLED) display, and an active-matrix OLED (AMO-LED) display.

Electronic devices include a smartphone, a tablet personal computer (PC), a portable multimedia player (PMP), a laptop PC, a wearable device, etc. Because most electronic devices operate by power supplied from batteries, it is important to lower power consumption. Accordingly, there is a need for a method of displaying various pieces of information through a display device while reducing the amount of power consumed by the display device included in an electronic device.

SUMMARY

One or more example embodiments provide a display driving circuit for receiving a sensing signal from a sensor hub and displaying images on a display panel based on the sensing signal.

According to an aspect of an example embodiment, a display driving circuit includes: an interface configured to receive, from a sensor hub including an acceleration sensor, an acceleration sensing signal of the acceleration sensor; and a processor configured to: calculate a number of steps based on the acceleration sensing signal; generate sensing image data based on the number of steps; and control a display panel to display an image indicating the number of steps.

According to another aspect of an example embodiment, a display driving circuit for driving a display panel in a normal mode and an Always On Display (AOD) mode in which less power is consumed than in the normal mode, the display driving circuit including: an interface configured to receive, from a sensor hub including at least one sensor, a sensing signal of each of the at least one sensor; and a processor configured to: generate sensing image data based on the sensing signal of each of the at least one sensor; transmit at least one sensing signal of the sensing signal of each of the at least one sensor to a host configured to control the display driving circuit; and control the display panel to display an image based on the sensing image data.

According to another aspect of an example embodiment, a display driving circuit includes: at least one processor; and a storage medium storing one or more instructions which, when executed by the at least one processor, are used by the at least one processor to: receive a sensing signal from a sensor hub including at least one sensor; perform a determination regarding whether the sensing signal corresponds to a priority signal, as soon as the sensing signal is received; and generate sensing image data based on the determination and the sensing signal.

BRIEF DESCRIPTION OF DRAWINGS

The above and other aspects and features will be more apparent from the following description of example embodiments, taken in conjunction with the accompanying drawings, in which.

DETAILED DESCRIPTION

Hereinafter, one or more embodiments are described with reference to the attached drawings. Embodiments described herein are example embodiments, and thus, the present disclosure is not limited thereto, and may be realized in various other forms. Each example embodiment provided in the following description is not excluded from being associated with one or more features of another example or another embodiment also provided herein or not provided herein but consistent with the present disclosure. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Figure 1:
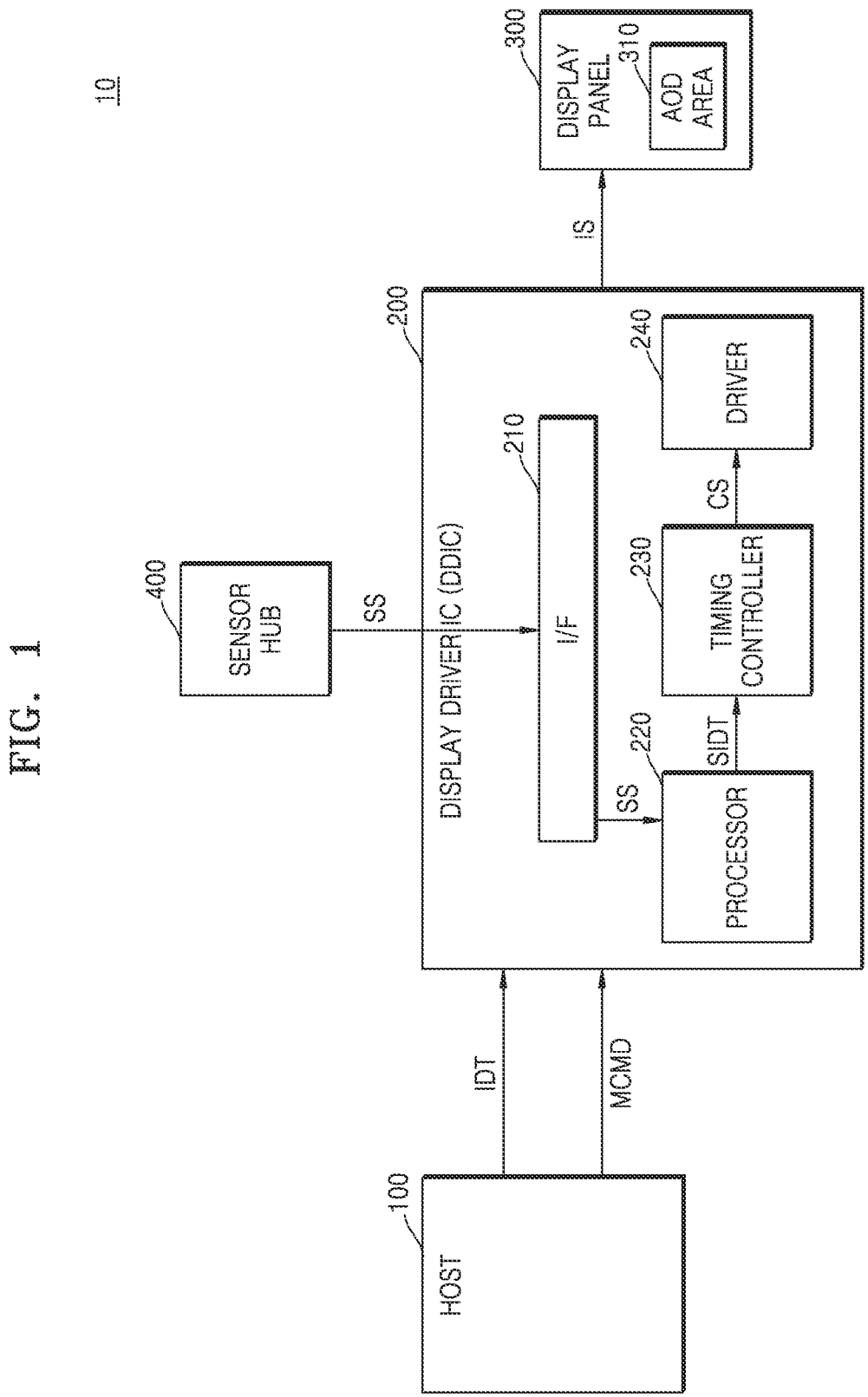
FIG. 1 is a block diagram of a display system according to an example embodiment.

FIG. 1 is a block diagram of a display system according to an example embodiment.

A display system 10 according to an example embodiment may be provided in or mounted on an electronic device having an image display function. Examples of the electronic device may include a smartphone, a tablet personal computer (PC), a Portable Multimedia Player (PMP), a camera, a wearable device, an Internet of Things (IOT) device, a television, a Digital Video Disk (DVD) player, a refrigerator, an air conditioner, an air purifier, a set-top box, a robot, a drone, various medical instruments, a navigation device, a Global Positioning System (GPS) receiver, an Advanced Drivers Assistance System (ADAS), vehicle devices, furniture, or various measurement devices.

Referring to FIG. 1, the display system 10 may include a host 100, a display driving circuit 200 (or a display driving integrated circuit), and a display panel 300. According to an example embodiment, the display driving circuit 200 and the display panel 300 may be embodied as a single module, and the module may be referred to as a display device. For example, the display driving circuit 200 may be mounted on a circuit film, such as a Tape Carrier Package (TCP), a Chip On Film (COF), or a Flexible Print Circuit (FPC), and attached to the display panel 300 in a Tape Automatic Bonding (TAB) method or may be mounted in a non-display area of the display panel 300 in a Chip On Glass (COG) method or a Chip On Plastic (COP) method.

The display system 10 may operate in a normal mode or an Always On Display (AOD) mode in which less power is consumed than in the normal mode. The normal mode may be a mode in which a screen is displayed through the display panel 300 while the host 100 is in an active state, and may refer to a state in which steady state power is provided. The normal mode may be a mode in which images are displayed on the display panel 300 as the host 100 controls the display driving circuit 200.

The AOD mode may refer to a mode in which the screen is displayed through the display panel 300 while the host 100 is in an inactive state. The inactive state may be a turn-off state that requires booting to switch to the active state. The inactive state may refer to a state in which power provided to the host 100 is limited and less power is supplied than in the normal mode.

The host 100 may generally control the display system 10. The host 100 may generate image data IDT to be displayed on the display panel 300 and transmit the image data IDT, commands (e.g., a mode change command MCMD), etc., to the display driving circuit 200.

The host 100 may be an Application Processor (AP). However, the host 100 is not limited thereto and may be implemented in various types of processors, such as a Central Processing Unit (CPU), a microprocessor, a multimedia processor, and a Graphics Processing Unit (GPU). In an example embodiment, the host 100 may be implemented as an Integrated Circuit (IC) or as a mobile AP or a System on Chip (SoC).

The host 100 may identify whether to change a mode of the display system 10 from the normal mode to the AOD mode or from the AOD mode to the normal mode. For example, the host 100 may monitor whether or not a user input is detected during a designated period of time, maintain the display system 10 in the normal mode according to the user input being detected, and change the mode of the display system 10 to the AOD mode according to the user input not being detected. As another example, the host 100 may monitor whether or not a user input for inactivating the display panel 300 is detected and change the mode of the display system 10 from the normal mode to the AOD mode according to the user input for inactivating the display panel 300 being detected.

The host 100 may transmit the mode change command MCMD for a mode change to the display driving circuit 200. The display driving circuit 200 may operate by switching to the AOD mode from the normal mode or to the normal mode from the AOD mode based on the mode change command MCMD.

The host 100 may include a host interface circuit for transmitting the image data IDT and the mode change command MCMD to the display driving circuit 200. The display driving circuit 200 may include a DDIC interface circuit for receiving the image data IDT and the mode change command MCMD from the host 100. The host and the DDIC interface circuit may support an RGB interface, a CPU interface, a serial interface, a Mobile Display Digital Interface (MDDI), an Inter Integrated Circuit (I2C) interface, a Serial Peripheral Interface (SPI), a Micro Controller Unit (MCU) interface, a Mobile Industry Processor Interface (MIPI), an embedded Display Port (eDP) interface, D-sub-miniature (D-sub), an optical interface, a High Definition Multimedia Interface (HDMI), and the like. In an example embodiment, the host and the DDIC interface circuit may also support a Mobile High-definition Link (MHL) interface, a Secure Digital (SD) card/Multi-Media Card (MMC) interface, or an Infrared Data Association (IrDA) standard interface.

In an example embodiment, the DDIC interface circuit may receive the image data IDT when the mode switches from the normal mode to the AOD mode and then may block a channel, through which the host 100 is connected to the display driving circuit 200, for a certain period of time.

In an example embodiment, the host 100 may receive sensing signals SS from the display driving circuit 200. A sensor hub 400 may not be connected to the host 100. The host 100 may not receive the sensing signals SS from the sensor hub 400. The host 100 may receive, from the display driving circuit 200, at least one of the sensing signal SS of each of the at least one sensor of the sensor hub 400. For example, in the normal mode, the host 100 may receive the sensing signals SS from the display driving circuit 200.

The host 100 may generate the image data IDT, which is to be displayed on the display panel 300, based on the sensing signals SS and may transmit the image data IDT, the command (e.g., the mode change command MCMD), etc., to the display driving circuit 200.

The display driving circuit 200 may convert the image data IDT received from the host 100 into image signals IS for driving the display panel 300 and provide the image signals IS to the display panel 300, thereby displaying images on the display panel 300. The display driving circuit 200 may receive, from the host 100, the image data IDT including background image data and additional image data. In an example embodiment, the display driving circuit 200 may store the background image data and the additional image data in an internal memory of the display driving circuit 200. For example, in the AOD mode, the display driving circuit 200 may receive the background image data and the additional image data. However, one or more example embodiments are not limited thereto, and, in the AOD mode, the display driving circuit 200 may not receive the image data IDT, and instead may generate at least one of the background image data and the additional image data. The background image data may refer to an image corresponding to the entire display area of the display panel 300, and the additional image data may refer to an image corresponding to at least a portion of the display area of the display panel 300. The additional image data may be an image corresponding to an AOD area 310 of the display panel 300.

The display driving circuit 200 may include an interface 210, a processor 220, a timing controller 230, and a driver

240. In an example embodiment, the display driving circuit 200 may receive the sensing signal SS from the sensor hub 400. The display driving circuit 200 may be connected to the sensor hub 400. The sensing signal may include at least one of an event signal indicating the occurrence of an event and sensing information including information regarding an event.

The sensor hub 400 may include at least one sensor and a controller for controlling the at least one sensor. For example, the sensor hub 400 may include an illuminance sensor, an altitude sensor, a GPS sensor, a health care sensor, an acceleration sensor, and a battery sensor. However, the sensors included in the sensor hub 400 are not limited to the above-listed sensors, and various types of sensors may be included in the sensor hub 400. The sensor hub 400 may transmit, to the display driving circuit 200, sensing signals respectively generated from the sensors included in the sensor hub 400. The sensor hub 400 external to the display system 10. The sensor hub 400 may be included in the display system 10.

User convenience information corresponding to a sensing signal of each of at least one sensor may be displayed on the display panel 300. For example, user convenience information of the altitude sensor may be altitude information. User convenience information of the illuminance sensor may be brightness information of the display panel 300. The user convenience information of the illuminance sensor may be represented as a brightness change of the display panel 300. User convenience information of the GPS sensor may be location information. User convenience information of the health care sensor may be a heart rate. User convenience information of the battery sensor may be a residual battery. User convenience information of the acceleration sensor may be the number of steps.

The processor 220 may receive the sensing signal SS of each of at least one sensor from the sensor hub 400 through the interface 210. The processor 220 may receive an acceleration sensing signal from the acceleration sensor of the sensor hub 400 through the interface 210. The processor 220 may generate sensing image data SIDT used to display images on the display panel 300, based on the sensing signal SS. For example, the processor 220 may use the background image data, the additional image data, and the sensing signal SS to generate the sensing image data SIDT used to display, on the display panel 300, an image obtained by combining the background image with the additional image.

In an example embodiment, in at least one of the normal mode and the AOD mode, the processor 220 may receive the sensing signal SS of each of at least one sensor from the sensor hub 40 through the interface 210. For example, in the normal mode and the AOD mode, the processor 220 may receive the sensing signal SS of each of at least one sensor from the sensor hub 400.

The processor 220 may transmit, to the host 100, at least one of the sensing signal SS of each of at least one sensor, the sensing signal SS being received from the sensor hub 400. In an example embodiment, in the normal mode, the processor 220 may transmit, to the host 100, at least one of the sensing signal SS of each of at least one sensor, the sensing signal SS being received from the sensor hub 400. However, one or more example embodiments are not limited thereto, and the processor 220 may transmit sensing data to the host 100. The sensing data may indicate data used to display, on the display panel, user convenience information corresponding to the sensing signal SS. The sensing data may be generated by the processor 220, based on the reception of the sensing signal SS. For example, sensing data used to display the number of steps on the display panel 300 may be acceleration data.

The processor 220 may calculate number of steps of a user based on an acceleration sensing signal. For example, when receiving the acceleration sensing signal, the processor 220 may calculate the number of steps by adding one step to the current step count. The processor 220 may generate sensing image data SIDT used to display, on the display panel 300, an image corresponding to the step count. The processor 220 may generate new sensing image data SIDT corresponding to the calculated number of steps or generate sensing image data SIDT corresponding to the number of steps calculated by using the background image data which is stored in the display driving circuit 200, the additional image data, and the sensing signal SS.

The processor 220 may determine whether the sensing signal SS corresponds to a priority signal. The priority signal may indicate a signal for which the sensing image data IDT needs to be generated as soon as the sensing signal SS is received from the sensor hub 400. In this regard, upon the reception of the sensing signal SS, the processor 220 may determine whether the sensing signal SS corresponds to the priority signal for which information corresponding to the sensing signal SS needs to be displayed on the display panel 300. The processor 220 may determine whether the sensing signal SS corresponds to the priority signal, according to a type of the sensor generating the sensing signal SS. In an example embodiment, the processor 220 may determine whether the sensing signal SS corresponds to the priority signal, based on the user input. The user input may be received from the host 100.

In an example embodiment, the processor 220 may receive an acceleration sensing signal SS of the acceleration sensor from the sensor hub 400 through the interface 210. The processor 220 may determine that the acceleration sensing signal SS of the acceleration sensor does not correspond to the priority signal. However, one or more example embodiments are not limited thereto, and the processor 220 may determine that the acceleration sensing signal SS corresponds to the priority signal. The processor 220 may determine that the acceleration sensing signal SS corresponds to the priority signal, based on the user input. For example, the user input may indicate which of the at least one sensor corresponds to the priority signal.

The processor 220 may receive a sensing signal SS of the illuminance sensor from the sensor hub 400 through the interface 210. The processor 220 may determine that the sensing signal SS of the illuminance sensor corresponds to the priority signal. The processor 220 may receive a sensing signal SS of the health care sensor from the sensor hub 400 through the interface 210. The processor 220 may determine that the sensing signal SS of the health care sensor corresponds to the priority signal.

The processor 220 may determine whether the sensing signal SS corresponds to the priority signal and generate the sensing image data SIDT based on the determination. The phrase "generation of the sensing image data SIDT" may include starting the generation of the sensing image data SIDT. In an example embodiment, when it is determined that the sensing signal SS corresponds to the priority signal, the processor 220 may start an operation of generating the sensing image data SIDT based on the sensing signal SS as soon as the determination is made. For example, as soon as it is determined that the sensing signal SS of the illuminance sensor corresponds to the priority signal, the processor 220 may generate the sensing image data SIDT based on the sensing signal SS of the illuminance sensor.

When it is determined that the sensing signal SS does not correspond to the priority signal, the processor 220 may generate the sensing image data SIDT based on the sensing signal SS after a preset period of time has passed from a point in time when the determination is made. For example, the processor 220 may generate the sensing image data SIDT based on the sensing signal SS of the acceleration sensor after a preset period of time from a point in time when it is determined that the sensing signal SS of the acceleration signal does not correspond to the priority signal.

The processor 220 may be a Micro Controller Unit (MCU). However, one or more example embodiments are not limited thereto, and the processor 220 may be realized as various types of processors, such as a CPU, a microprocessor, a multimedia processor, and a GPU. Also, the processor 220 may be a logic circuit implemented as at least one logic gate.

The timing controller 230 may generate a control signal CS to control display of the sensing image data SIDT on the display panel 300.

The driver 240 may receive a control signal CS from the timing controller 230. The driver 240 may generate image signals IS for displaying the sensing image data SIDT on the display panel 300, based on the control signal CS. Operations of the timing controller 230 and the driver 240 are described in detail with reference to FIG. 3.

The display panel 300 may be a display on which an image is actually displayed and may be one of various display devices, e.g., a thin film transistor-liquid crystal display (TFT-LCD), an organic light emitting diode (OLED) display, a field emission display, a plasma display panel (PDP), and the like. The display panel 300 may display two-dimensional images according to image signals IS that are electrically transmitted. The display panel 300 may be realized as a different type of a flat panel display or a flexible display panel.

In the AOD mode, images may be displayed in the AOD area 310 of the display panel 300. In an example embodiment, the AOD area 310 may be at least some portions of the display panel 300. For example, the AOD area 310 may be an area where images are displayed when the display system 10 operates in the AOD mode (or a low-power mode). The AOD area 310 does not refer to a specific area on the display panel 300, and the location, size, number, and the like of the AOD area 310 on the display panel 300 may change according to time or operation conditions.

The display driving circuit 200 according to an example embodiment may immediately receive the sensing signal SS from the sensor hub 400 and transmit the sensing signal SS to the host 100. Accordingly, the workload of the host 100 may be reduced, and because the sensor hub 400 is not directly connected to the host 100, the degree of freedom of a design may be improved. When it is possible to determine whether the sensing signal SS received from the sensor hub 400 corresponds to the priority signal and when the received sensing signal SS corresponds to the priority signal, the sensing image data SIDT may be quickly generated and displayed on the display panel 300. As the determination as to whether the sensing signal SS corresponds to the priority signal is made and a point in time when the sensing image data SIDT is generated is adjusted according to the determination, the amount of power consumed by the display driving circuit may be reduced.

Figure 2:
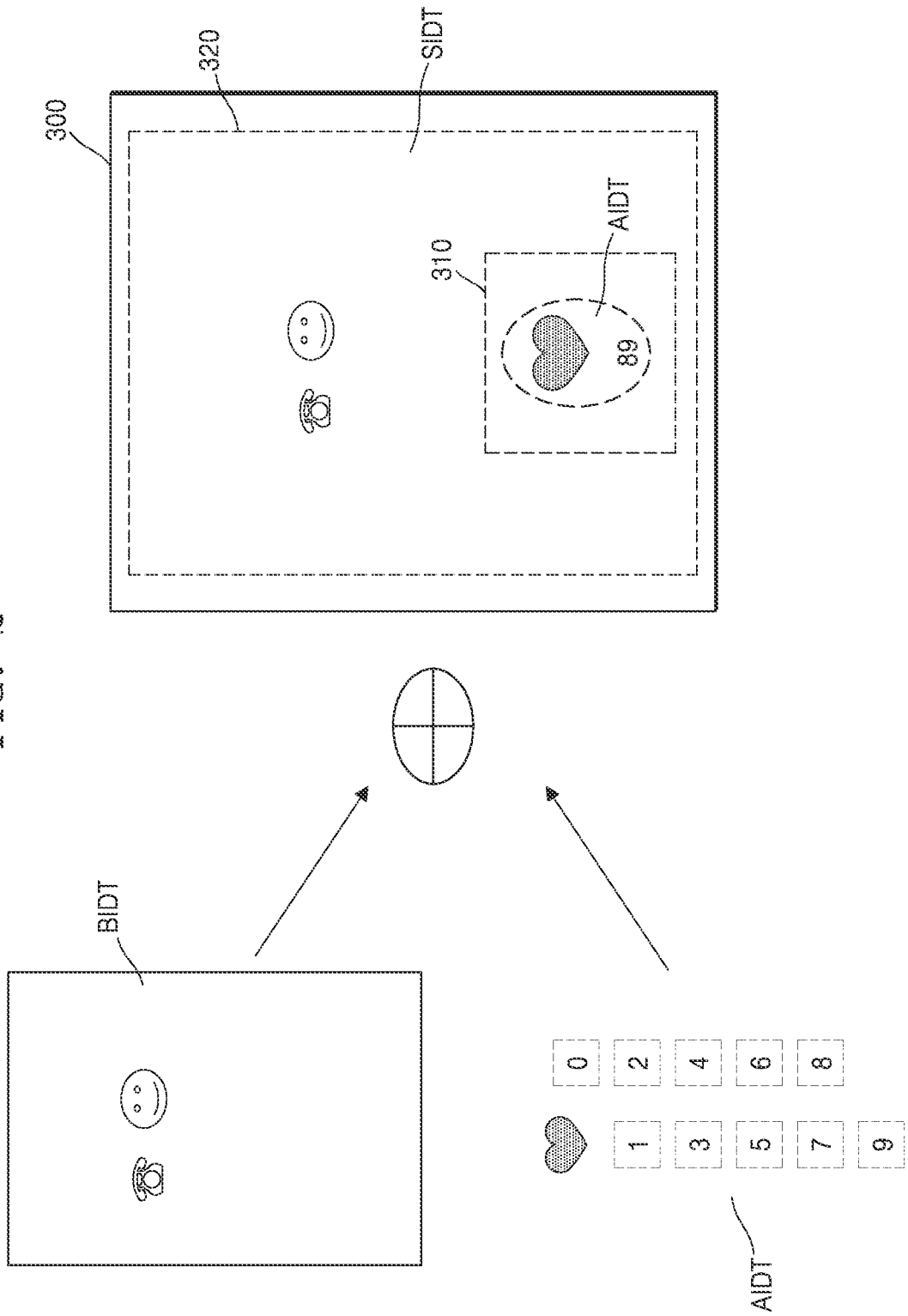
FIG. 2 is a diagram for explaining sensing image data actually displayed on a display panel, according to an example embodiment.

FIG. 2 is a diagram for explaining sensing image data actually displayed on a display panel, according to an example embodiment. In FIG. 2, for convenience of explanation, background image data BIDT, additional image data AIDT, and sensing image data SIDT are indicated as images.

Referring to FIGS. 1 and 2, the display driving circuit 200 may receive the background image data BIDT and the additional image data AIDT. The background image data BIDT and the additional image data AIDT may be included in the image data IDT. The background image data BIDT may refer to an image displayed in a background area 320 of the display panel 300. The background area 320 may be the entire area of the display panel 300 and include the AOD area 310. The additional image data AIDT may indicate an image displayed in the AOD area 310 of the display panel 300.

The sensing image data SIDT may be a combination of the background image data BIDT and the additional image data AIDT. The display driving circuit 200 may generate the sensing image data SIDT based on the sensing signal SS. When a sensing signal SS of a sensor is received, the display driving circuit 200 may select additional image data AIDT corresponding to the sensing signal SS and generate the additional image data AIDT corresponding to the sensing signal SS. For example, when the sensing signal SS of the acceleration sensor is received, the display driving circuit 200 may calculate the number of steps of the user based on the sensing signal SS of the acceleration sensor. The display driving circuit 200 may select the additional image data AIDT having a shoe shape that corresponds to the number of steps. Also, the display driving circuit 200 may calculate the number of steps as 89 by using the sensing signal SS and select the additional image data AIDT of numbers 8 and 9. The display driving circuit 200 may combine the additional image data AIDT, which includes the shoe shape, the number 8, and the number 9, with the background image data BIDT and generate the sensing image data SIDT.

When the sensing signal SS is the sensing signal SS of the illuminance sensor, the display driving circuit may generate the sensing image data SIDT including illuminance control data. When the sensing image data SIDT is displayed on the display panel 300, the illuminance of the display panel 300 may be controlled according to the illuminance control data. In the AOD area 310, at least one of the altitude information, the location information, the heart rate, and the residual battery may be displayed. However, one or more example embodiments are not limited thereto, and various pieces of information may be displayed in the AOD area 310.

The sensing image data SIDT may be displayed on the display panel 300. In detail, the display driving circuit 200 may convert the sensing image data SIDT into the image signals IS for driving the display panel 300, and the image signals IS may be displayed on the display panel 300.

Figure 3:
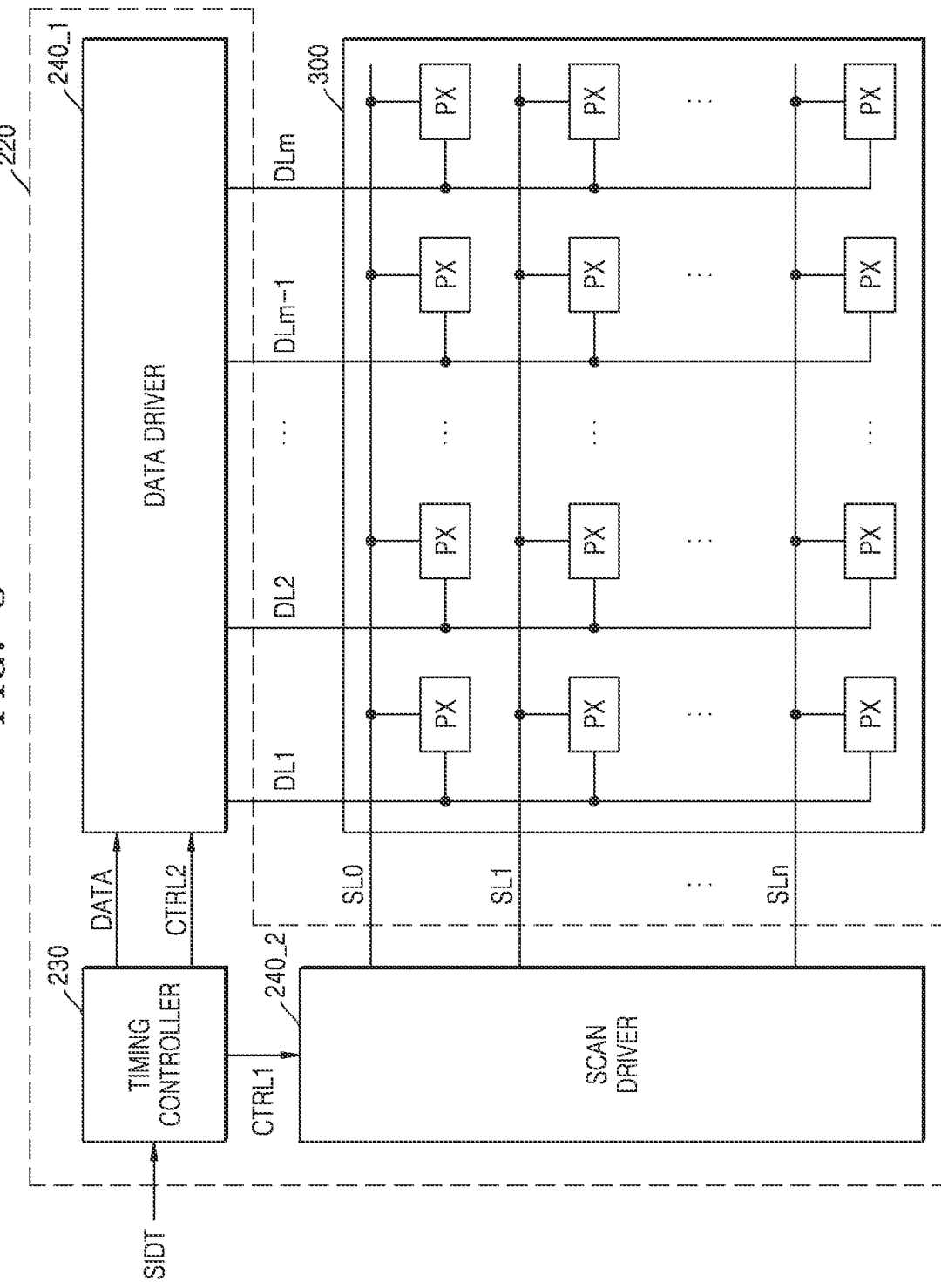
FIG. 3 is a block diagram of a display device according to an example embodiment.

FIG. 3 is a block diagram of a display device according to an example embodiment. Because the display driving circuit 200, the timing controller 230, drivers 240_1 and 240_2, and the display panel 300 of FIG. 3 respectively correspond to the display driving circuit 200, the timing controller 230, the driver 240, and the display panel 300 of FIG. 1, repeated descriptions thereof are omitted.

Referring to FIG. 3, the display device may include the display driving circuit 200 and the display panel 300, and the display driving circuit 200 may include the timing controller 230, a data driver 240_1 and a scan driver 240_2. However, the display driving circuit 200 may not include the scan driver 240_2, and the scan driver 240_2 may be included in the display device separately from the display driving circuit 200.

The display panel 300 may include a plurality of pixels PX arranged in a matrix form, and may control the pixels PX to output visual signals to display images in frame units. The display panel 300 includes scan lines SL0 to SLn arranged in a row direction, data lines DL1 to DLm arranged in a column direction, and pixels PX formed at intersection points at which the scan lines SL0 to SLn cross the data lines DL1 to DLm. The display panel 300 includes a plurality of horizontal lines (or rows), and one horizontal line includes the pixels PX connected to one gate line.

The scan driver 240_2 may sequentially select the scan lines SL0 to SLn by sequentially providing gate-on signals to the scan lines SL0 to SLn based on a first control signal CTRL1 provided from the timing controller 230. According to the gate-on signals output from the scan driver 240_2, the scan lines SL0 to SLn may be sequentially selected, and as a grayscale voltage corresponding to the pixels PX is applied to the pixels PX connected to the selected one of the scan lines SL0 to SLn through the data lines DL1 to DLm, a display operation may be performed. During a period in which the gate-on signals are not provided to the scan lines SL0 to SLn, gate-off signals (e.g., a gate voltage of a logic high level) may be provided to the scan lines SL0 to SLn.

The data driver 240_1 may convert image data DATA into image signals based on a second control signal CTRL2 and provide the image signals to the data lines DL1 to DLm. The image signals may be analog signals. The data driver 240_1 may include a plurality of channel amplifiers, and each of the channel amplifiers may provide image signals to at least one of the data lines respectively corresponding to the channel amplifiers.

The timing controller 230 may generally control operations of the display panel 300. The timing controller 230 may be realized as hardware, software, or a combination of hardware and software, and for example, the timing controller 230 may include digital logic circuits and registers which perform various functions described below.

The timing controller 230 may receive the sensing image data SIDT and generate control signals (e.g., the first control signal CTRL1 and the second control signal CTRL2) for controlling the data driver 240_1 and the scan driver 240_2 based on a received signal. For example, the timing controller 230 may generate the control signals (e.g., the first control signal CTRL1 and the second control signal CTRL2) to control display of images on the display panel 300 by using the sensing image data SIDT. Also, the timing controller 230 may convert a format of the sensing image data SIDT, which is received from the processor (e.g., the processor 220 of FIG. 1), to conform to the interface specification with the data driver 240_1 and may transmit the converted data DATA to the data driver 240_1.

Figure 4:
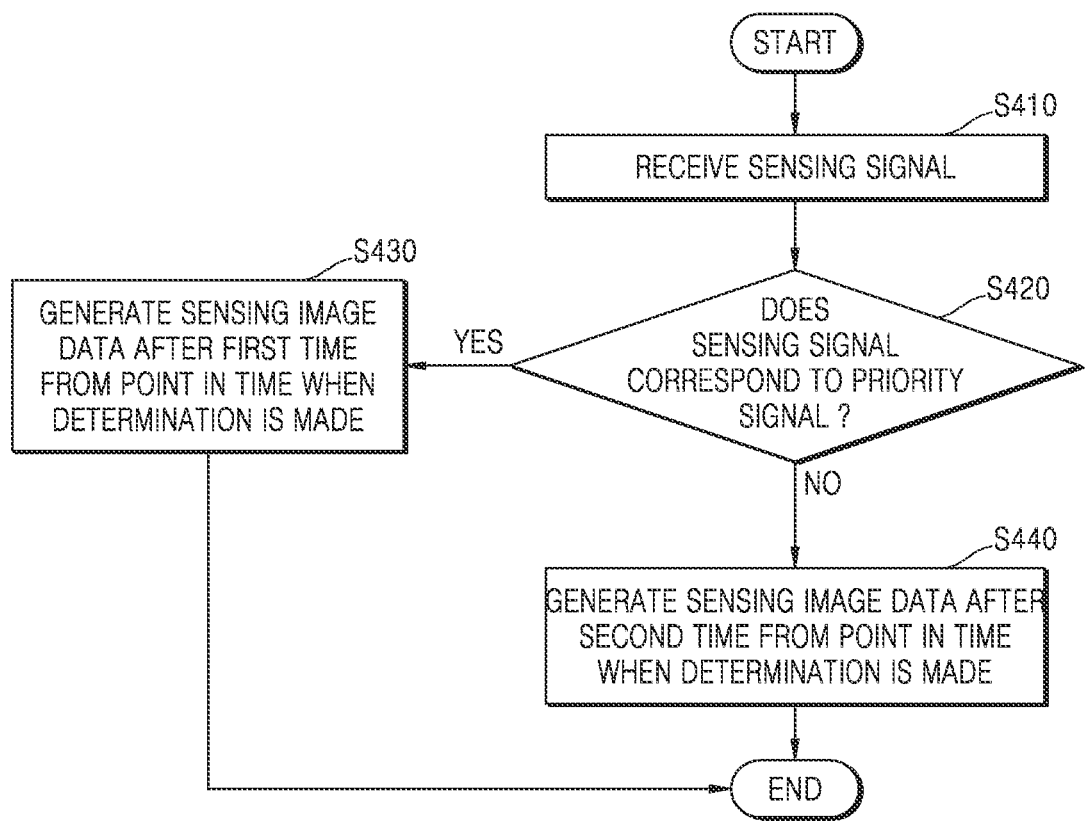
FIG. 4 is a flowchart of an operating method of a display driving circuit, according to an example embodiment.

FIG. 4 is a flowchart of an operating method of a display driving circuit, according to an example embodiment. In detail, FIG. 4 shows an operating method of the processor 220 of FIG. 1. The descriptions that are the same as those provided above are omitted.

In operation S410, a display driving circuit (e.g., the display driving circuit 200 of FIG. 1) may receive a sensing signal. The display driving circuit may receive the sensing signal from a sensor hub (e.g., the sensor hub 400 of FIG. 1). The display driving circuit may receive a sensing signal of each of at least one sensor included in the sensor hub.

In operation S420, the display driving circuit may determine whether the sensing signal corresponds to a priority signal. The display driving circuit may determine whether the sensing signal of each of the at least one sensor included in the sensor hub corresponds to the priority signal. The display driving circuit may identify which sensor's sensing signal is received from the sensor hub. For example, the display driving circuit may identify that the sensing signal received from the sensor hub is an acceleration sensing signal of the acceleration sensor. When it is determined that the sensing signal corresponds to the priority signal, the display driving circuit may perform operation S430. When it is determined that the sensing signal does not correspond to the priority signal, the display driving circuit may perform operation S440.

When it is necessary to generate the sensing image data SIDT based on the sensing signal as soon as the sensing signal is received from the sensor hub, the display driving circuit may determine the sensing signal as the priority signal. For example, the display driving circuit may determine that a sensing signal of an illuminance sensor corresponds to the priority signal. The display driving circuit may determine whether the sensing signal corresponds to the priority signal, based on user convenience information. When the user convenience information requires accuracy, the display driving circuit may determine the sensing signal as the priority signal. For example, because the heart rate needs to be accurate, the display driving circuit may determine that a sensing signal of a health care sensor corresponds to the priority signal.

When it is not necessary to generate the sensing image data SIDT based on the sensing signal as soon as the sensing signal is received from the sensor hub, the display driving circuit may not determine the sensing signal as the priority signal. For example, the display driving circuit may receive a sensing signal of an acceleration sensor from the sensor hub. The display driving circuit may determine that the sensing signal of the acceleration sensor does not correspond to the priority signal.

In an example embodiment, the display driving circuit may determine whether the sensing signal corresponds to the priority signal, based on a user input. The display driving circuit may receive a first user input from a host. The first user input may indicate which of the at least one sensor corresponds to the priority signal in order to select which user convenience information is to be immediately displayed. The first user input may be provided through a display panel (e.g., the display panel 300 of FIG. 1). The display driving circuit may determine whether the sensing signal corresponds to the priority signal, based on the user convenience information indicated by the first user input. The display driving circuit may determine a sensing signal of a sensor, which corresponds to the user convenience information indicated by the first user input, as the priority signal. For example, the user convenience information indicated by the first user input may be the heart rate. A sensor corresponding to the heart rate may be the health care sensor. When receiving the sensing signal of the health care sensor from the sensor hub, the display driving circuit may determine that the sensing signal of the health care sensor corresponds to the priority signal. As another example, the first user input may indicate the number of steps, and a sensor corresponding to the number of steps may be the acceleration sensor. When receiving an acceleration sensing signal of the acceleration sensor from the sensor hub, the display driving circuit may determine that the acceleration sensing signal corresponds to the priority signal.

The first user input may indicate at least one of altitude information, brightness information, location information, heart rate, a residual battery, and the number of steps, all of which are the user convenience information. For example, it is assumed that the first user input indicates the heart rate and the brightness information as the user convenience information. The sensor corresponding to the heart rate may be the health care sensor, and the sensor corresponding to the brightness information may be the illuminance sensor. When receiving the sensing signal of the health care sensor from the sensor hub, the display driving circuit may determine that the sensing signal of the health care sensor corresponds to the priority signal. When receiving the sensing signal of the acceleration sensor from the sensor hub, the display driving circuit may determine that the acceleration sensing signal does not correspond to the priority signal. When receiving the sensing signal of the illuminance sensor from the sensor hub, the display driving circuit may determine that the sensing signal of the illuminance sensor corresponds to the priority signal.

In operation S430, when it is determined that the sensing signal corresponds to the priority signal, the display driving circuit may generate sensing image data based on the sensing signal after a first time period from a point in time when the determination is made. In an example embodiment, the first time period may be a very short period of time. For example, the first time period may be 0.1 seconds. In an example embodiment, when it is determined that the sensing signal corresponds to the priority signal, the display driving circuit may generate the sensing image data based on the sensing signal as soon as the determination is made. For example, when it is determined that the acceleration sensing signal corresponds to the priority signal, the display driving circuit may generate the sensing image data based on the acceleration sensing signal as soon as the determination is made.

In operation S440, when it is determined that the sensing signal does not correspond to the priority signal, the display driving circuit may generate the sensing image data based on the sensing signal after a second time period from a point in time when the determination is made. The second time period may be different from the first time period. The second time period may be set in advance in the display driving circuit. In an example embodiment, the second time period may be longer than the first time period. For example, the second time period may be 5 seconds. However, one or more example embodiments are not limited thereto, and the first time period and the second time period may vary. The display driving circuit may flexibly generate the sensing image data by checking whether the sensing signal corresponds to the priority signal and differently setting a point in time, when the operation of generating the sensing image data starts, according to whether the sensing signal corresponds to the priority signal, and thus, the power consumption may be reduced.

Figure 5:
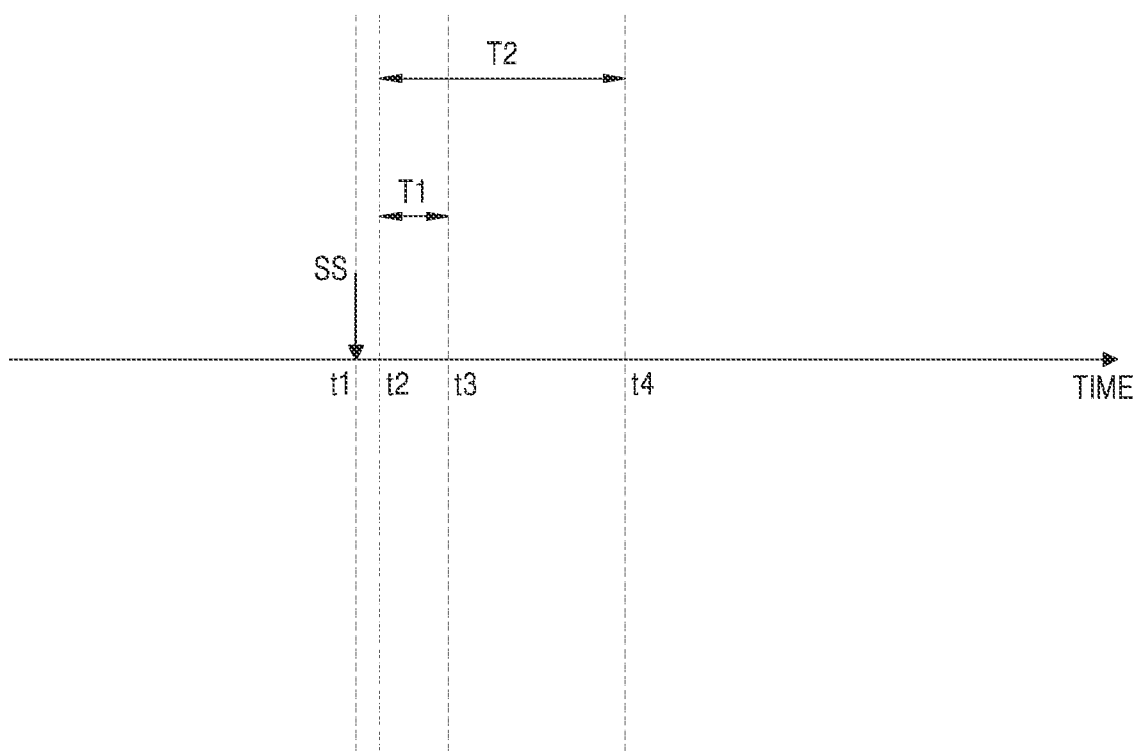
FIG. 5 is a graph for explaining a first time period and a second time period, according to an example embodiment.

FIG. 5 is a graph for explaining a first time period and a second time period, according to an example embodiment. The descriptions that are the same as those provided above are omitted.

Referring to FIG. 5, the display driving circuit may receive a sensing signal SS at a first point in time t1. The display driving circuit may receive the sensing signal SS and determine, in a second point in time t2, whether the sensing signal SS corresponds to a priority signal. The display driving circuit may determine whether the sensing signal of each of at least one sensor included in the sensor hub corresponds to the priority signal. Hereinafter, it is assumed that a sensing signal SS of an acceleration sensor is received.

When it is determined that the sensing signal corresponds to the priority signal, the display driving circuit may generate the sensing image data based on the sensing signal SS after a first time period T1 from a point in time when the determination is made. The display driving circuit may determine that the sensing signal SS of the acceleration sensor corresponds to the priority signal. The display driving circuit may generate the sensing image data based on the sensing signal SS of the acceleration sensor after the first time period T1 from a second point in time t2. In this regard, the display driving circuit may start an operation of generating the sensing image data from a third point in time t3.

When it is determined that the sensing signal does not correspond to the priority signal, the display driving circuit may generate the sensing image data based on the sensing signal SS after a second time period T2 from a point in time when the determination is made. The display driving circuit may determine that the sensing signal SS of the acceleration sensor does not correspond to the priority signal. The display driving circuit may generate the sensing image data based on the sensing signal SS of the acceleration sensor after the second time period T2 from the second point in time t2. In this regard, the display driving circuit may start the operation of generating the sensing image data from a fourth point in time t4.

The first time period T1 may be different from the second time period T2. In an example embodiment, the first time period T1 may be shorter than the second time period T2. For example, the second time period T2 may be 5 seconds, and the first time period T1 may be 0.1 seconds. The first time period T1 and the second time period T2 may be set in advance. However, one or more example embodiments are not limited thereto, and the first time period and the second time period may vary. The first time period T1 may be a very short period of time. When it is determined that the sensing signal SS corresponds to the priority signal, the display driving circuit may start the operation of generating the sensing image data based on the sensing signal SS as soon as the determination is made.

Figure 6:
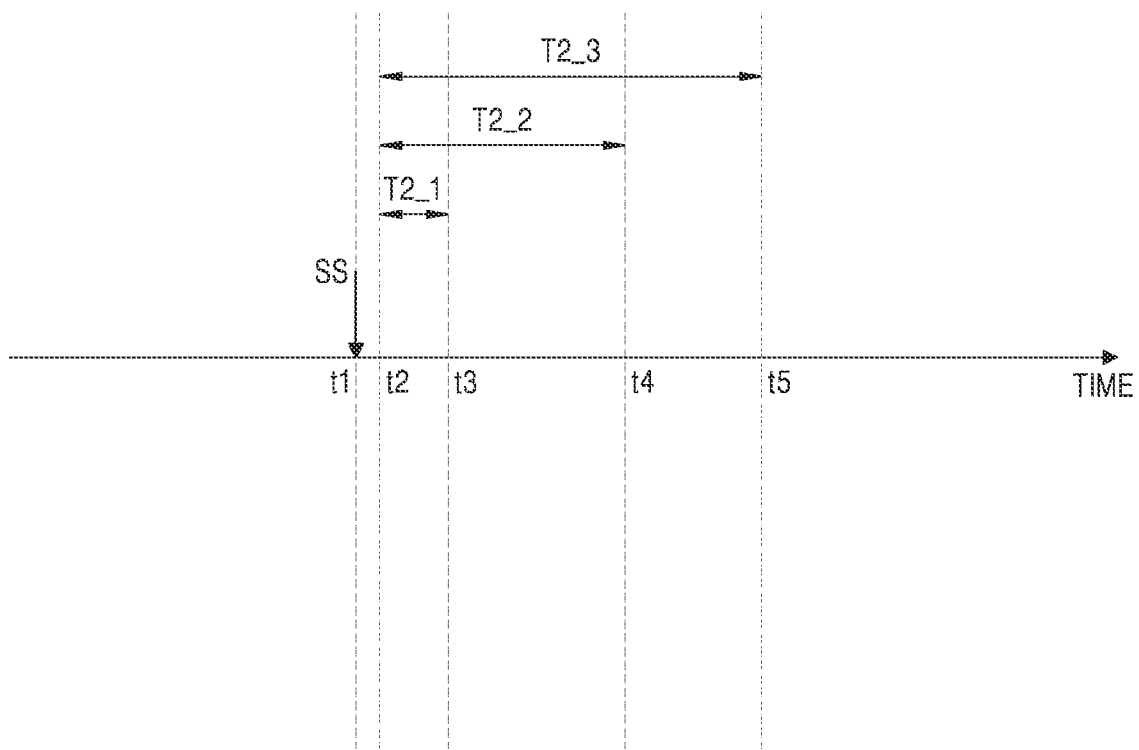
FIG. 6 is a graph for explaining a second time period, according to an example embodiment.

FIG. 6 is a graph for explaining a second time period, according to an example embodiment. The descriptions that are the same as those provided above are omitted.

Referring to FIG. 6, the display driving circuit may receive a sensing signal SS at a first point in time t1. The display driving circuit may receive the sensing signal SS and determine, in a second point in time t2, whether the sensing signal SS corresponds to a priority signal. The display driving circuit may determine whether the sensing signal of each of at least one sensor included in the sensor hub corresponds to the priority signal.

When it is determined that the sensing signal SS does not correspond to the priority signal, the display driving circuit may generate the sensing image data based on the sensing signal SS after second time periods T2_1, T2_2, and T2_3 from the point in time when the determination is made. In an example embodiment, the second time period T2_1, T2_2, and T2_3 respectively corresponding to the sensing signals of the sensors may differ.

It is assumed that the sensing signal SS is the sensing signal SS of the health care sensor. The display driving circuit may determine that the sensing signal SS of the health care sensor does not correspond to the priority signal. The second time period T2_1 may correspond to display operations performed based on the sensing signal SS of the health care sensor. The display driving circuit may generate the sensing image data based on the sensing signal SS of the health care sensor after the second time period T2_1 from the second point in time t2. The display driving circuit may start the operation of generating the sensing image data, based on the sensing signal SS of the health care sensor from a third point in time t3.

It is assumed that the sensing signal SS is the sensing signal SS of the acceleration sensor. The display driving circuit may determine that the sensing signal SS of the acceleration sensor does not correspond to the priority signal. The second time period T2_2 may correspond to display operations performed based on the sensing signal SS of the acceleration sensor. The display driving circuit may generate the sensing image data based on the sensing signal SS of the acceleration sensor after the second time period T2_2 from the second point in time t2. The display driving circuit may start the operation of generating the sensing image data, based on the sensing signal SS of the acceleration sensor from a fourth point in time t4.

It is assumed that the sensing signal SS is the sensing signal SS of the battery sensor. The display driving circuit may determine that the sensing signal SS of the battery sensor does not correspond to the priority signal. The second time period T2_3 may correspond to display operations performed based on the sensing signal SS of the battery sensor. The display driving circuit may generate the sensing image data based on the sensing signal SS of the battery sensor after the second time period T2_3 from the second point in time t2. The display driving circuit may start the operation of generating the sensing image data, based on the sensing signal SS of the battery sensor from a fifth point in time t5.

Figure 7:
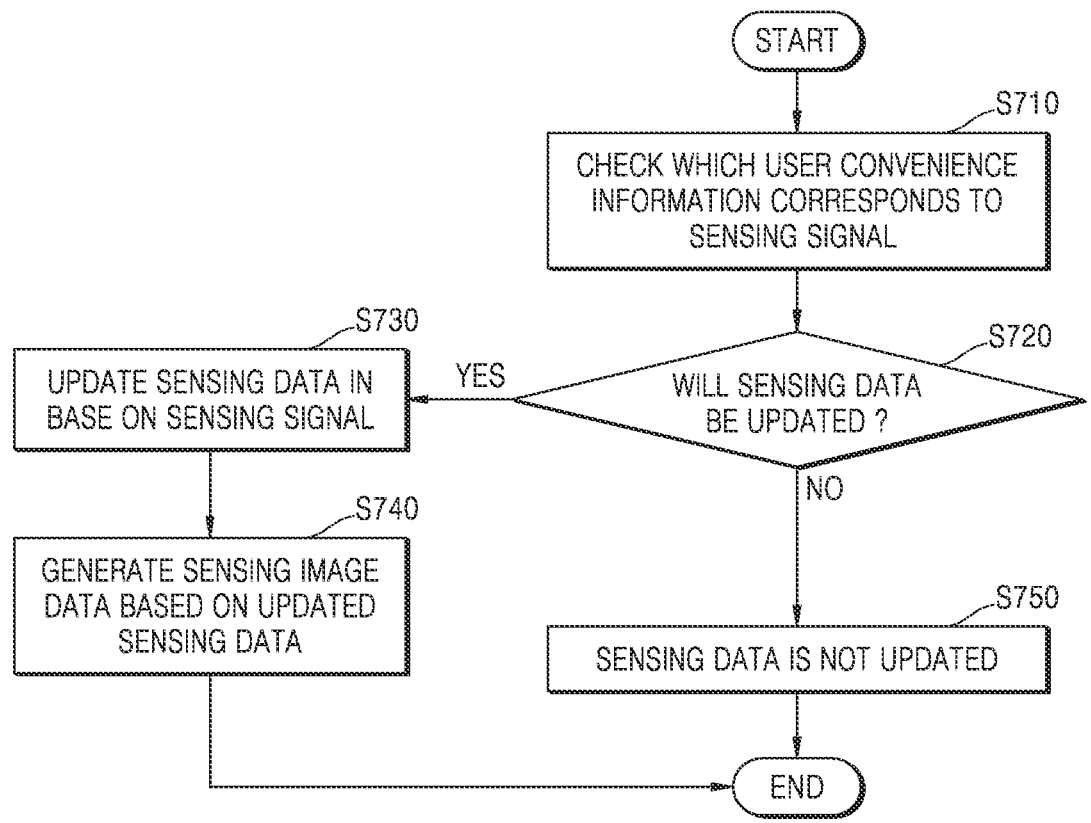
FIG. 7 is a flowchart of a method of generating sensing image data, according to an example embodiment.

FIG. 7 is a flowchart of a method of generating sensing image data, according to an example embodiment. In detail, the method of generating the sensing image data, which is described with reference to FIG. 7, may be included in each of operation S430 and operation S440 of FIG. 4. When it is determined that the sensing signal corresponds to the priority signal, the display driving circuit may start operation S710 after a first time period from a point in time when the determination is made. When it is determined that the sensing signal does not correspond to the priority signal, the display driving circuit may start operation S710 after a second time period from a point in time when the determination is made. The descriptions that are the same as those provided above are omitted.

In operation S710, the display driving circuit may check which user convenience information corresponds to the sensing signal. For example, the display driving circuit may check that the received sensing signal of the health care sensor corresponds to the heart rate. As another example, the display driving circuit may check that the received sensing signal of the acceleration sensor corresponds to the number of steps. Operation S710 may be omitted according to example embodiments.

In operation S720, the display driving circuit may determine whether to update sensing data. The display driving circuit may check user convenience information to determine whether to update the sensing data corresponding to the user convenience information. The sensing data may indicate data used to display, on the display panel, the user convenience information corresponding to the sensing signal. The sensing data may be generated based on the receiving of a sensing signal of at least one sensor. The sensing data may correspond to each of the at least one sensor. For example, sensing data used to display the heart rate on the display panel may be heart rate data. Sensing data used to display the number of steps on the display panel may be acceleration data.

The display driving circuit may receive the sensing signal and determine whether to update the sensing data corresponding to the sensing signal. For example, the display driving circuit may receive a sensing signal of the acceleration sensor and determine whether to update acceleration data based on the sensing signal of the acceleration sensor. When determining to update the sensing data, the display driving circuit may perform operation S730, and when determining not to update the sensing date, the display driving circuit may perform operation S750.

In an example embodiment, the display driving circuit may determine whether to update the sensing data based on a user input. The display driving circuit may receive a second user input from the host. The second user input may indicate user convenience information that the user desires to keep updating. The display driving circuit may determine whether to update the sensing data based on the user convenience information indicated by the second user input. The display driving circuit may determine to update sensing data corresponding to the user convenience information indicated by the second user input. For example, the second user input may indicate at least one of altitude information, brightness information, location information, heart rate, a residual battery, and the number of steps, all of which are the user convenience information. For example, it is assumed that the user convenience information indicated by the second user input is the heart rate. When receiving the sensing signal of the health care sensor from the sensor hub, the display driving circuit may determine to update heart rate data. As another example, it is assumed that the second user input indicates the number of steps, and the display driving circuit may determine to update acceleration data when receiving the sensing signal of the acceleration sensor from the sensor hub. It is assumed that the second user input indicates the brightness information, and the display driving circuit may determine to update the illuminance data when receiving the sensing signal of the illuminance sensor from the sensor hub.

In operation S730, the display driving circuit may update the sensing data based on the sensing signal. For example, it is assumed that the user convenience information indicates the heart rate is 80 beats per minute, and heart rate data indicating that the heart rate is 81 beats per minute is received. When receiving the sensing signal of the health care sensor, the display driving circuit may update the heart rate data based on the sensing signal so that the heart rate data may indicate that the heart rate is 81 beats per minute. As another example, it is assumed that the user convenience information indicates the steps are 100. When receiving the sensing signal of the acceleration sensor indicating an additional step, the display driving circuit may update the step count data to indicate 101 steps, based on the sensing signal of the acceleration sensor. In detail, when receiving the acceleration sensing signal indicative of one or more additional steps, the display driving circuit may calculate the number of steps based on the acceleration sensing signal and update the step count data. As another example, it is assumed that the illuminance data indicates the display panel has a brightness of 5. The display driving circuit may update the illuminance data to make the display panel have a brightness of 3, based on the sensing signal of the illuminance sensor. When the brightness of the display panel is 3, the display panel may be darker than when the brightness thereof is 5. However, because the above numbers, e.g., 100, 101, 80, 81, 5, 3, etc., are merely examples, one or more example embodiments are not limited thereto. In an example embodiment, when the sensing signal includes an event signal indicating the occurrence of events, the display driving circuit may read sensing information from a sensor corresponding to the sensing data when determining to update the sensing data, and may update the sensing data based on the sensing information. The sensing signal may include at least one of an event signal indicating the occurrence of events, and sensing information including information regarding an event.

In operation S740, the display driving circuit may generate the sensing image data based on the updated sensing data. The sensing image data may be image data used to display the sensing data on the display panel as images. For example, when the updated heart rate data indicates 81 beats per minute, the display driving circuit may combine an image of the number 8, an image of the number 1, and a heart image representing the heart rate and generate the sensing image data. For example, when the updated step count data indicates 91 steps, the display driving circuit may combine an image of the number 9, an image of the number 1, and a shoe-shaped image indicating the number of steps and generate the sensing image data. As another example, when the updated illuminance data indicates that the brightness of the display panel is 3, the display driving circuit may generate sensing image data including illuminance control data used to adjust the brightness of the display panel to 3.

In operation S750, when determining not to update the sensing data, the display driving circuit may not update the sensing data. For example, it is assumed that the step count data indicates 100 steps. Although the sensing signal of the acceleration sensor is received, the display driving circuit may maintain the step count data indicating 100 steps. The display driving circuit may not update the sensing data and generate sensing image data based on existing sensing data. However, one or more example embodiments are not limited thereto, and the display driving circuit may not update the sensing data and not generate the sensing image data. When receiving the sensing signal, the display driving circuit may not entirely update the sensing data corresponding to the sensing signal, determine sensing data to be updated, and update the sensing data according to the determination; thus, the amount of consumed power may be reduced.

Figure 8:
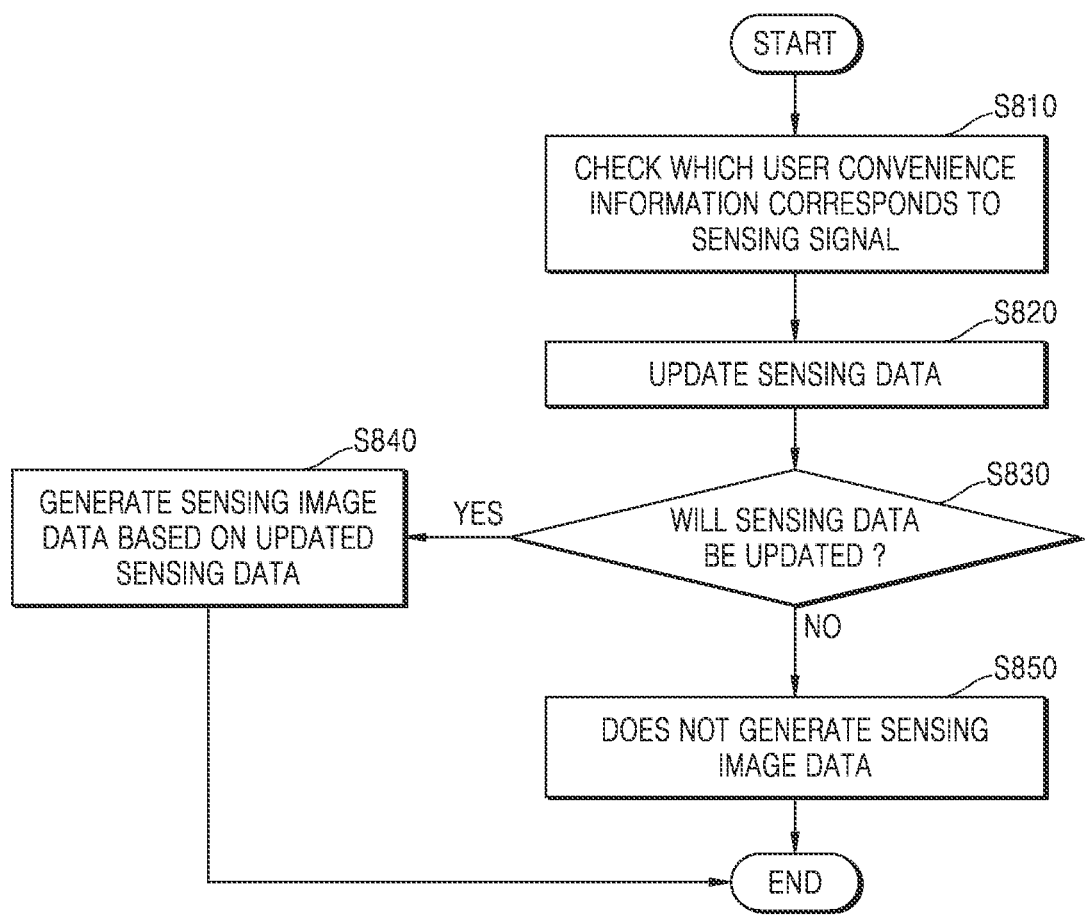
FIG. 8 is a flowchart of a method of updating sensing data, according to an example embodiment.

FIG. 8 is a flowchart of a method of updating sensing data, according to an example embodiment. In detail, the method of generating the sensing image data, which is described with reference to FIG. 8, may be included in each of operation S430 and operation S440 of FIG. 4. When it is determined that the sensing signal corresponds to the priority signal, the display driving circuit may start the operation from operation S810 after a first time period from a point in time when the determination is made. When it is determined that the sensing signal does not correspond to the priority signal, the display driving circuit may start the operation from operation S810 after a second time period from a point in time when the determination is made. Also, operation S810 of FIG. 8 may correspond to operation S710 of FIG. 7. The descriptions that are the same as those provided above are omitted.

In operation S810, the display driving circuit may check which user convenience information corresponds to the sensing signal.

In operation S820, the display driving circuit may update the sensing data. The display driving circuit may receive the sensing signal and update the sensing data corresponding to the sensing signal. The display driving circuit may update the sensing data based on the sensing signal. For example, the display driving circuit may update heart rate data based on the sensing signal of the health care sensor. As another example, the display driving circuit may update step count data based on the sensing signal of the acceleration sensor. As another example, the display driving circuit may update the illuminance data based on the sensing signal of the illuminance sensor.

In operation S830, the display driving circuit may determine whether to generate the sensing image data. The display driving circuit may determine whether to update the sensing image data based on the updated sensing data. In an example embodiment, the display driving circuit may determine whether to generate the sensing image data, based on a user input. The display driving circuit may receive a third user input from the host. The third user input may indicate user convenience information that the user desires to display on the display panel. The display driving circuit may determine whether to generate the sensing image data based on the user convenience information included in the third user input. The display driving circuit may generate the sensing image data corresponding to the user convenience information included in the third user input.

For example, the third user input may indicate at least one of altitude information, brightness information, location information, heart rate, a residual battery, and the number of steps, all of which are the user convenience information. For example, it is assumed that the user convenience information included in the third user input is the heart rate. The display driving circuit may determine to generate the sensing image data based on the updated heart rate data. As another example, it is assumed that the third user input indicates the number of steps, and the display driving circuit determines to generate the sensing image data based on the updated acceleration data. It is assumed that the third user input indicates the brightness information, and the display driving circuit may determine to generate the sensing image data based on the updated illuminance data.

In operation S840, when determining to generate the sensing image data, the display driving circuit may generate the sensing image data based on the updated sensing data. The display driving circuit may generate the sensing image data and transmit, to the display panel, an image signal generated based on the sensing image data so that the user convenience information is to be displayed on the display panel. For example, when the updated step count data indicates 91 steps, the display driving circuit may combine an image of the number 9, an image of the number 1, and a shoe-shaped image indicating the steps and generate the sensing image data. The number of steps may be displayed on the display panel.

In operation S850, when determining not to generate the sensing image data, the display driving circuit may not generate the sensing image data based on the updated sensing data. When the display driving circuit does not generate the sensing image data, no image signal may be transmitted to the display panel, and user convenience information may not be displayed on the display panel. For example, when determining not to generate the sensing image data based on the step count data, the display driving circuit may not generate the sensing image data, and the number of steps may not be displayed on the display panel. By determining whether to generate the sensing image data based on a user input, the display driving circuit may only generate the sensing image data corresponding to the user convenience information that the user wants to display on the display panel, and the amount of power consumed to generate the sensing image data may be reduced.

Figure 9:
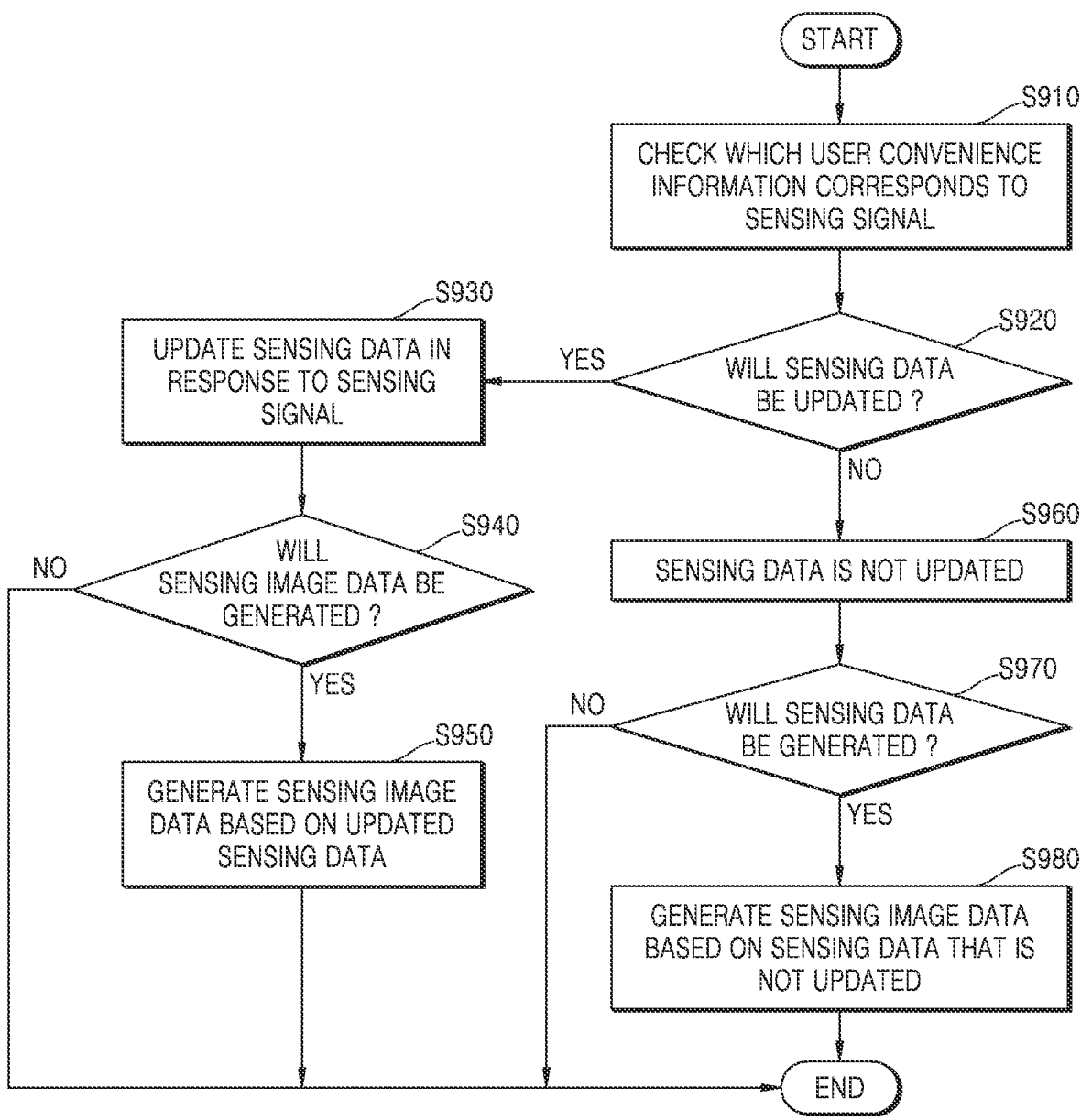
FIG. 9 is a flowchart of a method of generating sensing image data, according to an example embodiment.

FIG. 9 is a flowchart of a method of generating sensing image data, according to an example embodiment. In detail, a method of generating the sensing image data, which is described with reference to FIG. 9, may be included in each of operation S430 and operation S440 of FIG. 4. When it is determined that the sensing signal corresponds to the priority signal, the display driving circuit may start the operation from operation S910 after a first time period from a point in time when the determination is made. When it is determined that the sensing signal does not correspond to the priority signal, the display driving circuit may start the operation from operation S910 after a second time period from a point in time when the determination is made. Operations S910, S920, S930, and S960 of FIG. 9 may correspond to operations S710, S720, S730, and S750 of FIG. 7, respectively. The descriptions that are the same as those provided above are omitted.

In an example embodiment, the display driving circuit may determine whether to update, based on a sensing signal, sensing data used to display on the display panel user convenience information corresponding to the sensing signal and whether to generate sensing image data based on the updated sensing data.

In operation S930, the display driving circuit may update the sensing data based on the sensing signal. In operation S940, the display driving circuit may determine whether to generate the sensing image data. The display driving circuit may determine whether to update the sensing image data based on the updated sensing data. In an example embodiment, the display driving circuit may determine whether to generate the sensing image data based on a user input. The display driving circuit may determine whether to generate the sensing image data based on the user convenience information included in the third user input. The display driving circuit may generate the sensing image data corresponding to the user convenience information included in the third user input. When determining to generate the sensing image data, the display driving circuit may generate the sensing image data based on the updated sensing data (operation S950). When determining not to generate the sensing image data, the display driving circuit may not generate the sensing image data.

In operation S960, the display driving circuit may not update the sensing data based on the sensing signal. In operation S970, the display driving circuit may determine whether to generate the sensing image data. The display driving circuit may determine whether to generate the sensing image data based on sensing data that is not updated. In an example embodiment, the display driving circuit may determine whether to generate the sensing image data based on the user input. The display driving circuit may generate the sensing image data corresponding to the user convenience information included in the third user input. When determining to generate the sensing image data, the display driving circuit may generate the sensing image data based on the sensing data that is not updated (operation S980). When determining not to generate the sensing image data, the display driving circuit may not generate the sensing image data.

Figure 10:
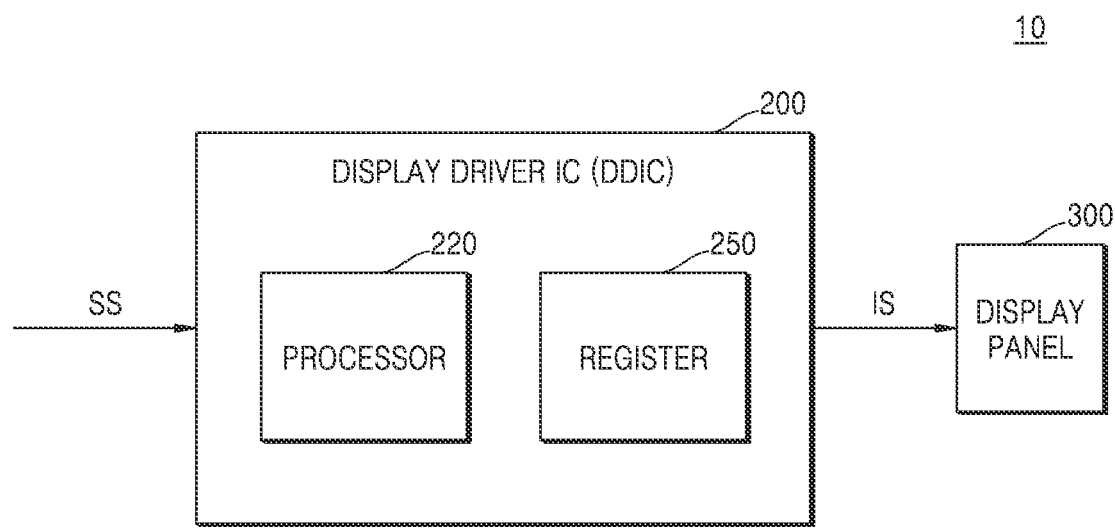
FIG. 10 is a diagram for explaining a display driving circuit according to an example embodiment.

FIG. 10 is a diagram for explaining a display driving circuit according to an example embodiment. Because the display system 10, the display driving circuit 200, the processor 220, and the display panel 300 of FIG. 10 respectively correspond to the display system 10, the display driving circuit 200, the processor 220, and the display panel 300 of FIG. 1, repeated descriptions thereof are omitted.

Referring to FIG. 10, the display driving circuit 200 may further include a register. The sensing signal SS may be transmitted to the display driving circuit 200, and a register 250 may store the sensing signal SS.

In an example embodiment, the processor 220 may determine whether to store the sensing signal SS in the register 250, based on whether the sensing signal SS corresponds to a priority signal. When it is determined that the sensing signal SS corresponds to the priority signal, the processor 220 may not store the sensing signal SS in the register 250. For example, when it is determined that the sensing signal SS of the illuminance sensor corresponds to the priority signal, the processor 220 may not store the sensing signal SS of the illuminance sensor in the register 250.

When it is determined that the sensing signal SS corresponds to the priority signal, the processor 220 may start the operation of generating the sensing image data after the first time period from the point in time when the determination is made. For example, when it is determined that the sensing signal SS corresponds to the priority signal, the processor 220 may not store the sensing signal SS in the register 250, and as soon as it is determined that the sensing signal SS corresponds to the priority signal, the processor 220 may start the operation of generating the sensing image data based on the sensing signal.

When it is determined that the sensing signal SS does not correspond to the priority signal, the processor 220 may store the sensing signal SS in the register 250. For example, when it is determined that the sensing signal SS of the acceleration sensor does not correspond to the priority signal, the processor 220 may store the sensing signal SS of the acceleration sensor in the register 250. When the sensing signal includes an event signal indicating the occurrence of events, the event signal may be stored in the register 250. When the sensing signal includes the event signal and sensing information including information regarding an event, the event signal and the sensing information may be stored in the register 250.

When it is determined that the sensing signal SS does not correspond to the priority signal, the processor 220 may start the operation of generating the sensing image data, based on the sensing signal SS stored in the register 250, after a preset period of time from the point in time when the determination is made. When it is determined that the sensing signal SS does not correspond to the priority signal, the processor 220 may start the operation of generating the sensing image data after a second time period from the point in time when the determination is made. For example, the processor 220 may determine that the sensing signal SS of the acceleration sensor does not correspond to the priority signal and store the sensing signal SS of the acceleration sensor in the register 250. After the second time period from the point in time when it is determined that the sensing signal SS of the acceleration sensor corresponds to the priority signal, the processor 220 may read the sensing signal SS of the acceleration sensor, which is stored in the register 250, and generate the sensing image data.

Figure 11:
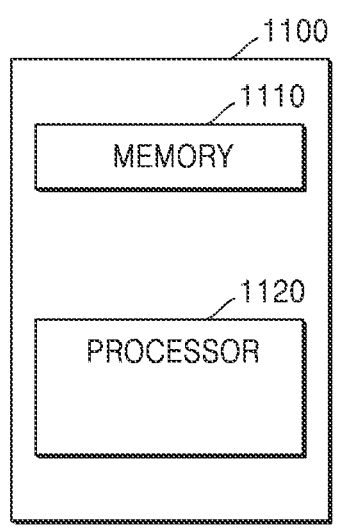
FIG. 11 is a block diagram for explaining a display driving circuit according to an example embodiment.

FIG. 11 is a block diagram for explaining a display driving circuit according to an example embodiment. A display driving circuit 1100 and a processor 1120 of FIG. 11 may correspond to the display driving circuit 200 and the processor 220 of FIG. 1, respectively. The descriptions that are the same as those provided above are omitted.

Referring to FIG. 11, the display driving circuit 1100 may include a memory 1110 and the processor 1120. The memory 1110 may be a storage medium in which at least one instruction executed by the processor 1120 is stored. For example, the memory 1110 may store instructions which are executed on the processor 1120 to generate the sensing image data based on the sensing signal.

The memory 1110 may be a storage medium for storing data, and may store, for example, a variety of algorithms, various programs, and different pieces of data. The memory 1110 may store one or more instructions. The memory 1110 may include at least one of volatile memory and non-volatile memory. The non-volatile memory may include Read Only Memory (ROM), Programmable ROM (PROM), Electrically Programmable ROM (EPROM), Electrically Erasable and Programmable ROM (EEPROM), flash memory, Phase-change RAM (PRAM), Magnetic RAM (MRAM), Resistive RAM (RRAM), or the like. The volatile memory may include Dynamic RAM (DRAM), Static RAM (SRAM), Synchronous DRAM (SDRAM), PRAM, MRAM, RRAM, or the like. Also, in an example embodiment, the memory 110 may include at least one of Hard Disk Drive (HDD), Solid State Drive (SSD), Compact Flash (CF), a Secure Digital (SD) card, a Micro Secure Digital (Micro-SD) card, a Mini Secure Digital (Mini-SD) card, an extreme digital (xD) card, or a memory stick. In an example embodiment, the memory 1110 may semi-permanently or temporarily store algorithms, programs, and one or more instructions to be executed by the processor 1120.

The processor 1120 may execute the one or more instructions stored in the memory 1110. The processor 1120 may execute the instructions to generate sensing image data. The processor 1120 may execute the instructions to receive a sensing signal from a sensor hub. The processor 1120 may execute the instructions to receive an acceleration sensing signal, calculate a number of steps based on the acceleration sensing signal, and generate sensing image data to display an image corresponding to the number of steps. The processor 1120 may execute the instructions to determine whether the sensing signal corresponds to the priority signal. The processor 1120 may execute the instructions to generate the sensing image data based on the determination as to whether the sensing signal corresponds to the priority signal. The processor 1120 may execute the instructions to transmit a sensing signal of each of at least one sensor to the host, the sensing signal being transmitted from the sensor hub.

Figure 12:
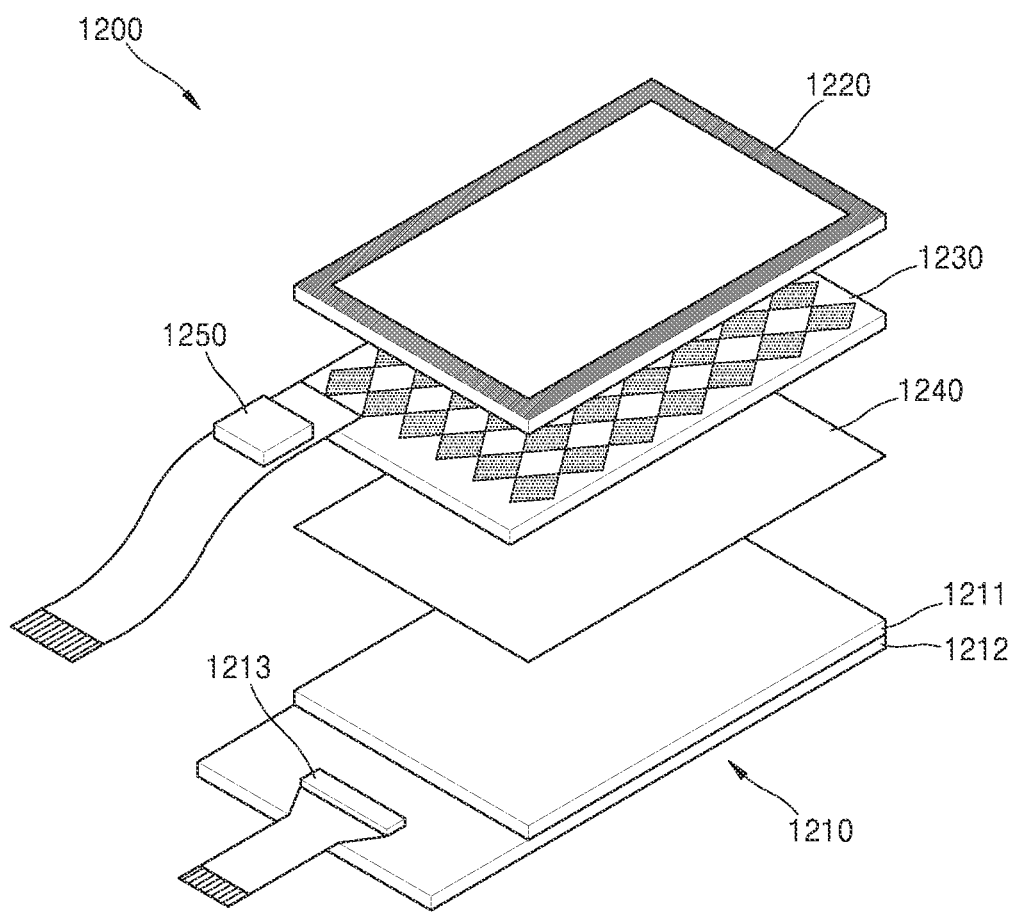
FIG. 12 is a diagram of a touch screen module according to an example embodiment.

FIG. 12 is a diagram of a touch screen module according to an example embodiment.

Referring to FIG. 12, a touch screen module 1200 may include a display device 1210, a polarizer 1240, a touch panel 1230, a touch controller 1250, and window glass 1220. The display device 1210 may include a display panel 1211, a printed circuit board 1212, and a display driving circuit 1213. The display driving circuit 1213 may be the display driving circuit 200 and 1100 described with reference to FIGS. 1 to 11.

The window glass 1220 may be formed of a material, such as acryl or tempered glass, and protect the touch screen module 1200 from scratches made by external impact or repeated touches. The polarizer 1240 may be prepared to improve optical characteristics of the display panel 1211. The display panel 1211 may be formed as a transparent electrode is patterned on the printed circuit board 1212. The display panel 1211 may include a plurality of pixels to display a frame. The display driving circuit 1213 may operate in the normal mode and the AOD mode. For example, the mode of the touch screen module 1200 may switch from the normal mode to the AOD mode when no touches from a user are detected for a certain period of time, and the display driving circuit 1213 may generate image signals to display an AOD image in an AOD area of the display panel 1211.

The touch screen module 1200 may further include a touch panel 1230 and a touch controller 1250. The touch panel 1230 may be formed as a transparent electrode, such as indium tin oxide (ITO), is patterned on a glass substrate or a Polyethylene Terephthalate (PET) film.

Figure 13:
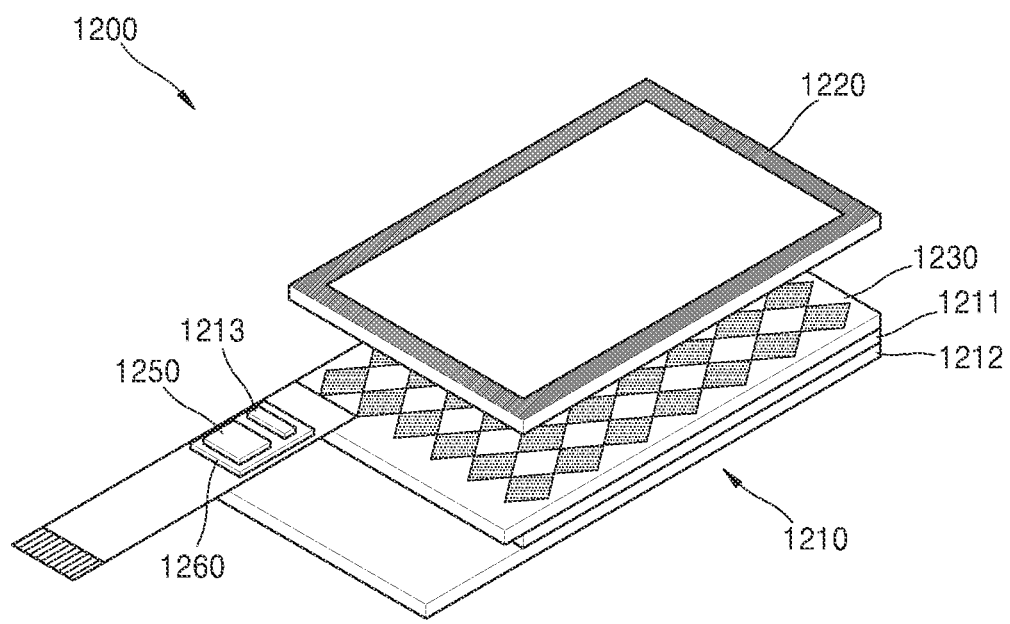
FIG. 13 is a diagram of the touch screen module according to an example embodiment.

FIG. 13 is a diagram of the touch screen module according to an example embodiment. Compared to FIG. 12, the touch panel 1230 may be combined with the display panel 1211. The descriptions that are the same as those provided above are omitted.

In an example embodiment, the touch panel 1230 may be formed on the display panel 1211. For example, pixels of the touch panel 1230 may be combined with those of the display panel 1211. The touch controller 1250 may calculate touch coordinates by detecting the occurrence of touches on the touch panel 1230 and transmit a result of the calculating to a host. The touch controller 1250 may be integrated into one semiconductor chip 1260 together with the display driving circuit 1213. A Touch-and-Display Driver Integration (TDDI) 260 may include the touch controller 1250 and the display driving circuit 1213.

In some example embodiments, each of the components represented by a block as illustrated in FIGS. 1, 3, 10 and 11 may be implemented as various numbers of hardware, software and/or firmware structures that execute respective functions described above, according to example embodiments. For example, at least one of these components may include various hardware components including a digital circuit, a programmable or non-programmable logic device or array, an application specific integrated circuit (ASIC), transistors, capacitors, logic gates, or other circuitry using use a direct circuit structure, such as a memory, a processor, a logic circuit, a look-up table, etc., that may execute the respective functions through controls of one or more microprocessors or other control apparatuses. Also, at least one of these components may include a module, a program, or a part of code, which contains one or more executable instructions for performing specified logic functions, and executed by one or more microprocessors or other control apparatuses. Also, at least one of these components may further include or may be implemented by a processor such as a central processing unit (CPU) that performs the respective functions, a microprocessor, or the like. Functional aspects of example embodiments may be implemented in algorithms that execute on one or more processors. Furthermore, the components, elements, modules or units represented by a block or processing steps may employ any number of related art techniques for electronics configuration, signal processing and/or control, data processing and the like.

While aspects of example embodiments have been particularly shown and described, it will be understood that various changes in form and details may be made therein without departing from the spirit and scope of the following claims.

What is claimed is:

1. A display driving circuit comprising:
   an interface configured to receive, from a sensor hub comprising an acceleration sensor, an acceleration sensing signal of the acceleration sensor; and
   a processor configured to:
      calculate a number of steps based on the acceleration sensing signal;
      perform a determination regarding whether the acceleration sensing signal corresponds to a priority signal based on the acceleration sensing signal being received,
      determine whether to store the acceleration sensing signal based on the determination,
      generate sensing image data based on the number of steps and the determination; and
      control a display panel to display an image indicating the number of steps.

2. The display driving circuit of claim 1, wherein the processor is further configured to:

based on the determination indicating the acceleration sensing signal corresponds to the priority signal, generate the sensing image data based on the acceleration sensing signal after a first time period beginning at a point in time corresponding to the determination; and based on the determination indicating the acceleration sensing signal does not correspond to the priority signal, generate the sensing image data based on the acceleration sensing signal after a second time period, which is different from the first time period, beginning at the point in time corresponding to the determination.

3. The display driving circuit of claim 2, wherein the first time period is shorter than the second time period.

4. The display driving circuit of claim 1, wherein the processor is further configured to:

determine whether to update sensing data based on the acceleration sensing signal according to a user input; and based on determining the sensing data is to be updated, generate the sensing image data, based on updated sensing data.

5. The display driving circuit of claim 1, wherein the processor is further configured to:

update sensing data based on the acceleration sensing signal, and, based on the sensing data, calculate the number of steps; and generate the sensing image data to indicate the number of steps calculated using updated sensing data based on a user input.

6. The display driving circuit of claim 1, wherein the processor comprises a Micro Controller Unit (MCU).

7. The display driving circuit of claim 1, wherein the processor comprises a logic circuit comprising at least one logic gate.

8. A display driving circuit for driving a display panel in a normal mode and an Always On Display (AOD) mode in which less power is consumed than in the normal mode, the display driving circuit comprising:

an interface configured to receive, from a sensor hub comprising at least one sensor, a sensing signal of each of the at least one sensor;

a register configured to store the sensing signal; and a processor configured to:

perform a determination regarding whether the sensing signal corresponds to a priority signal, based on the sensing signal being received;

determine whether to store the sensing signal based on the determination;

generate sensing image data based on the sensing signal of each of the at least one sensor and the determination;

transmit at least one sensing signal of the sensing signal of each of the at least one sensor to a host configured to control the display driving circuit; and control the display panel to display an image based on the sensing image data.

9. The display driving circuit of claim 8, wherein the processor is further configured to receive the sensing signal of each of the at least one sensor through the interface, in at least one of the normal mode and the AOD mode.

10. The display driving circuit of claim 8, wherein the processor is further configured to transmit, in the normal mode, the at least one sensing signal to the host.

11. The display driving circuit of claim 8, wherein the processor is further configured to, based on the determination indicating the sensing signal corresponds to the priority signal, not store the sensing signal in the register.

12. The display driving circuit of claim 8, wherein the processor is further configured to, based on the determination indicating the sensing signal does not correspond to the priority signal, store the sensing signal in the register.

13. The display driving circuit of claim 8, wherein the processor is further configured to, based on the determination indicating the sensing signal corresponds to the priority signal, start an operation of generating the sensing image data based on the sensing signal as soon as it is determined that the sensing signal corresponds to the priority signal without storing the sensing signal in the register.

14. The display driving circuit of claim 8, wherein the processor is further configured to, based on the determination indicating the sensing signal does not correspond to the priority signal, store the sensing signal in the register and start an operation of generating the sensing image data, based on the sensing signal stored in the register, after a preset time period beginning at a point in time corresponding to the determination.

15. The display driving circuit of claim 14, wherein the preset time period is different for the sensing signal of each of the at least one sensor.

16. The display driving circuit of claim 8, wherein the at least one sensor comprises an acceleration sensor, and wherein the processor is further configured to receive an acceleration sensing signal from the acceleration sensor and determine that the acceleration sensing signal does not correspond to the priority signal.

17. The display driving circuit of claim 8, wherein the at least one sensor comprises an illuminance sensor and a health care sensor, and wherein the processor is further configured to receive the sensing signal from each of the illuminance sensor and the health care sensor, and determine that the sensing signal from the illuminance sensor and the sensing signal from the health care sensor correspond to the priority signal.

18. A display driving circuit comprising:

at least one processor; and a storage medium storing one or more instructions which, when executed by the at least one processor, are used by the at least one processor to:

receive a sensing signal from a sensor hub comprising at least one sensor, the sensing signal comprising an acceleration sensing signal and the at least one sensor comprising an acceleration sensor;

perform a determination regarding whether the sensing signal corresponds to a priority signal, as soon as the sensing signal is received;

determine whether to store the sensing signal based on the determination; and generate sensing image data based on the determination and the sensing signal.

* * * * *